United States Patent [19]
Buslepp et al.

[11] Patent Number: 5,094,206
[45] Date of Patent: Mar. 10, 1992

[54] METHOD FOR CONTROLLING A CRANKCASE SCAVENGED TWO-STROKE ENGINE DURING DECELERATION FUEL CUT-OFF

[75] Inventors: Kenneth J. Buslepp, Shelby; Paul E. Reinke, Rochester; Douglas E. Trombley, Grosse Pointe, all of Mich.

[73] Assignee: General Motors Corporation, Detroit, Mich.

[21] Appl. No.: 659,777

[22] Filed: Feb. 25, 1991

[51] Int. Cl.⁵ .......................... F02D 9/08; F02D 41/12
[52] U.S. Cl. ..................................... 123/325; 123/327; 123/493
[58] Field of Search ................ 123/325, 327, 328, 493

[56] References Cited

U.S. PATENT DOCUMENTS

| | | | |
|---|---|---|---|
| 3,734,069 | 5/1973 | Akiyama et al. | 123/325 X |
| 4,391,246 | 7/1983 | Kawabata et al. | 123/328 X |
| 4,406,261 | 9/1983 | Ikeura | 123/328 X |
| 4,941,441 | 7/1990 | Watanabe | 123/325 |

FOREIGN PATENT DOCUMENTS 9516 8/1990 PCT Int'l Appl.

*Primary Examiner*—Tony M. Argenbright
*Attorney, Agent, or Firm*—Jimmy L. Funke

[57] ABSTRACT

A method is described for increasing engine braking, when a crankcase scavenged two-stroke engine is operated in a deceleration fuel cut-off mode. In response to the detection of operating conditions indicating engine operation in the deceleration fuel cut-off mode, the quantity of air inducted into the engine is decreased, for a predetermined period of time. After this period of time elapses, the quantity of air inducted into the engine is then increased. This is preferably accomplished by regulating the degree of opening of a throttle valve disposed within the engine air intake system. The initial closing of the throttle valve restricts air flow through the engine for a predetermined time, to maintain efficient catalyst operating temperatures in the engine exhaust system. During extended operation in the deceleration fuel cut-off mode, the throttle valve is opened, after the lapse of the predetermined time, to increase the quantity of air inducted by the engine. This results in increased engine braking, due to the additional work that must be performed in compressing the larger quantity of inducted air.

3 Claims, 3 Drawing Sheets

METHOD FOR CONTROLLING A CRANKCASE SCAVENGED TWO-STROKE ENGINE DURING DECELERATION FUEL CUT-OFF

BACKGROUND OF THE INVENTION

This invention relates to a method for controlling a crankcase scavenged engine during a deceleration fuel cut-off operating mode, and more particularly, to regulating the quantity of air inducted by such an engine, during deceleration fuel cut-off operation, to achieve increased engine braking.

It is customary to interrupt the supply of fuel to all cylinders of a four-stroke engine, during a mode of engine operation commonly known as deceleration fuel cut-off (DFCO). The DFCO mode is generally initiated when an engine powered vehicle is decelerating, and its engine output control element (throttle valve or accelerator pedal) is positioned for engine idling, i.e. no operator demand for additional engine output. Recovery from the DFCO mode typically occurs, when either the engine rotational speed drops below a predetermined minimum speed near idle, or the engine control element is moved from the idling position to accelerate engine rotation and increase output torque.

The purpose of the DFCO operating mode is to reduce fuel consumption, and maximize the engine braking that results from frictional drag and negative torque applied to the engine by its load. In addition, the customary closing of the air throttle valve during DFCO, reduces exhaust emissions from engines equipped with catalytic converters. Restricting engine air flow, during DFCO, decreases the cooling rate of the exhaust catalyst, thereby extending the period of time that the catalyst remains at efficient operating temperatures.

When a conventional crankcase scavenged two-stroke engine is operated in the DFCO mode, according to customary practice, the realized engine braking is substantially reduced from that achieved with four-stroke engines. This is particularly noticeable, when a vehicle equipped with a crankcase scavenged two-stroke engine is operated on extended negative grades. Here, the reduced engine braking is perceived as inadequate deceleration, which significantly degrades the drivability of vehicles employing crankcase scavenged, two-stroke engines. Consequently, a need exists for a method of increasing engine braking, when a crankcase scavenged, two-stroke engine is operated in the deceleration fuel cut-off mode.

SUMMARY OF THE INVENTION

In accordance with the present invention, a method is provided for regulating the quantity of air inducted by a crankcase scavenged two-stroke engine, to effectuate increased engine braking, when the engine is operated in a deceleration fuel cut-off mode. This is accomplished by first detecting engine operating conditions, that indicate engine operation in the deceleration fuel cut-off mode. In response to these detected operating conditions, the quantity of air inducted into the engine is decreased, for a predetermined period of time. After this period of time elapses, the quantity of air inducted into the engine is then increased. By initially decreasing the quantity of air inducted by the engine, the cooling rate in the engine catalytic converter is reduced, to extend the period of time that the catalyst remains at efficient operating temperatures. After the predetermined time has elapsed, the efficiency of the catalyst will have diminished due to cooling, so the quantity of air inducted by the engine can then be increased, without significantly increasing engine exhaust emissions. This results in additional engine loading, since the crankcase scavenged engine must perform more work to compress the larger quantity of inducted air. Consequently, during extended operation in the DFCO mode, this additional loading acts to increase engine braking and improve vehicle drivability.

Preferably, the quantity of air inducted by the crankcase scavenged, two-stroke engine is regulated by the degree of opening of a throttle valve disposed in the engine air intake system. After detecting engine operation in the DFCO mode, the throttle valve is completely closed, to restrict the quantity of air inducted by the engine. After the lapse of a predetermined time, the throttle valve is opened, at a defined rate, to its fully open position. Consequently, the engine is gradually loaded by the additional inducted air, to smoothly increase engine braking to a maximum, during extended DFCO operation.

These and other aspects and advantages of the invention may be best understood by reference to the following detailed description of the preferred embodiments, when considered in conjunction with the accompanying drawings.

DESCRIPTION OF THE PREFERRED EMBODIMENTS

Figure 1:
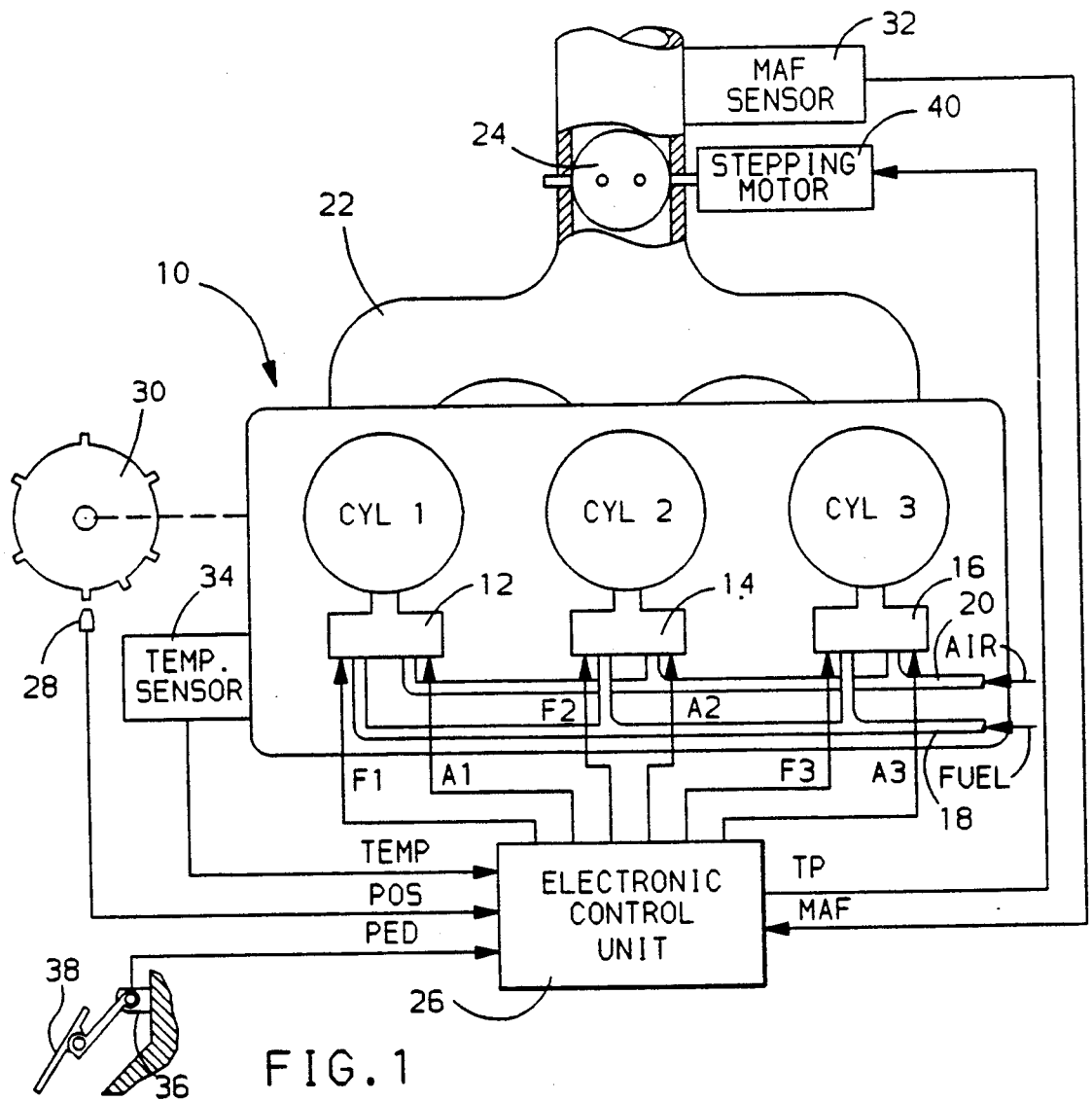
FIG. 1 schematically illustrates a crankcase scavenged, two-stroke engine and an associated control system for regulating the quantity of air inducted by the engine during deceleration fuel cut-off, in accordance with the principles of the present invention.

Referring to FIG. 1, there is shown schematically a crankcase scavenged, two-stroke engine, generally designated as 10, having three cylinders CYL1, CYL2, and CYL3. Each engine cylinder is individually fueled by a conventional pneumatic direct fuel injection system, which includes selectively operable, solenoid actuated fuel injectors 12, 14, and 16, and the associated conduit forming fuel rail 18 and air rail 20, which deliver fuel and compressed air, for injecting metered quantities of fuel into the cylinders. Engine 10 further includes an air intake manifold 22, with a throttle valve 24 therein, for controlling the quantity of air inducted by the engine.

As illustrated in FIG. 1, the operation of engine 10 is controlled by a conventional electronic control unit (ECU) 26, which derives input signals from several standard engine sensors. The ECU 26 includes a central processing unit, random access memory, read only memory, analog-to-digital and digital-to-analog converters, input/output circuitry, and clock circuitry, as will be recognized by those skilled in the art of computer engine control. The ECU 26 is supplied with a POS input signal that indicates the rotational position of engine 10. The POS input can be derived from a standard electromagnetic sensor 28, which is capable of detecting the passage of teeth on wheel 30, as it is rotated by engine 10. A MAF input signal indicates the mass air flow into engine 10, and can be obtained by any known means, as for example, a mass air flow (MAF) sensor 32 disposed in the engine intake manifold 22. In addition, a temperature sensor 34 provides the ECU 26 with an input signal TEMP, related to the engine coolant temperature; and a potentiometer 36 is employed to provide an input signal PED, which indicates the position of accelerator pedal 38.

During normal operation, the ECU 26 looks up the quantity of fuel to be injected into each cylinder from a table stored in memory, based upon the position of the accelerator pedal 38 (as indicated by the PED input signal). At appropriate rotational positions of the engine 10, as determined from the POS input signal, the ECU 26 generates pulsed signals F1-F3 and A1-A3, for respectively actuating the fuel and air solenoids (not shown), within injectors 12, 14, and 16. The width of the fuel pulses F1-F3, determines the metered quantity of fuel per cylinder (FPC) injected into the respective engine cylinders. The air pulses A1-A3 are timed in relation to the fuel pulses F1-F3, to supply the injectors with the appropriate volume of compressed air to drive the metered fuel into the engine cylinders.

To achieve the correct cylinder air-fuel ratio, ECU 26 computes a desired mass air flow in a conventional fashion from a lookup table based on current engine speed and the amount of fuel injected per cylinder. The actual mass air flow to the engine, as indicated by the MAF signal, is then controlled to the desired value, in a closed loop fashion, by opening or closing throttle valve 24. The ECU 26 accomplishes this by generating an appropriate throttle position TP output signal to drive a stepping motor 40, which is mechanically coupled to the throttle valve 24. Many of the additional sensor, actuators, and ECU input and output signals, that are generally present in a conventional engine control system, have not been specifically shown in FIG. 1, since they are not required in describing the present invention.

It is customary to completely interrupt the injection of fuel to all cylinders of a four-stroke internal combustion engine, during a mode of operation commonly referred to as deceleration fuel cut-off (DFCO). Entry into the DFCO operating mode is generally initiated, when an engine powered vehicle is decelerating, with its engine output control element (throttle valve or accelerator pedal) positioned for engine idling, with no operator demand for additional engine output. Recovery from the DFCO mode typically occurs, when either the engine rotational speed drops below a predetermined minimum speed near idle, or the engine control element is moved from the idling position to accelerate engine rotation and increase output torque.

The purpose of this operating mode is to reduce fuel consumption, and maximize the engine braking that results from frictional drag and negative torque applied to the engine by its load, as a vehicle is decelerating. In addition, the customary closing of the air throttle valve during DFCO reduces exhaust emissions from engines equipped with catalytic converters. Restricting engine air flow during DFCO, decreases the cooling rate of the exhaust catalyst, and as a result, extends the period of time that the catalyst remains at efficient operating temperatures.

When the crankcase scavenged two-stroke engine 10 is operated in the DFCO mode, in accordance with the above described conventional practice, the realized engine braking is substantially reduced from that achieved with four-stroke engines. This is particularly noticeable, when operating a vehicle equipped with a crankcase scavenged two-stroke engine on an extended negative grade. The reduced engine braking in these situations is perceived as insufficient deceleration of the engine, which significantly degrades the drivability of vehicles employing this type engine.

As is well known, the structure and operation of a conventional crankcase scavenged engine differs significantly from that of a four-stroke engine, see for example, U.S. Pat. Nos. 4,920,789 and 4,932,371. In a crankcase scavenged engine, each cylinder has a separate crankcase chamber, into which air is inducted during a portion of the engine operating cycle. This inducted air is compressed during that portion of the engine cycle, when a crankcase chamber is decreasing in volume due to the downstroke of a piston within its cylinder, and is then transferred to the cylinder combustion chamber, where it mixes with fuel for combustion. Also, a crankcase scavenged engine does not include intake or exhaust valves. Instead inlet and exhaust ports open directly into the walls of the engine cylinders. These inlet and exhaust ports are covered and uncovered by the movement of pistons within their cylinders. As combustion is initiated, a piston moves in its downstroke, uncovering an exhaust port to release burned fuel, and then uncovering an inlet port to enable the entry of a fresh charge of air, which assists in driving out the burned fuel.

In crankcase scavenged two-stroke engines, roller type bearings are generally used in place of the higher friction, planer type crankshaft bearings usually present in four-stroke engines. The use of these low friction crankshaft bearings and the absence of intake and exhaust valves in crankcase scavenged, two-stroke engines, significantly reduce the frictional forces acting to brake the engine during DFCO operation. Consequently, a need exists for a method of increasing engine braking, during DFCO operation, for this type of two-stroke engine.

Figure 2:
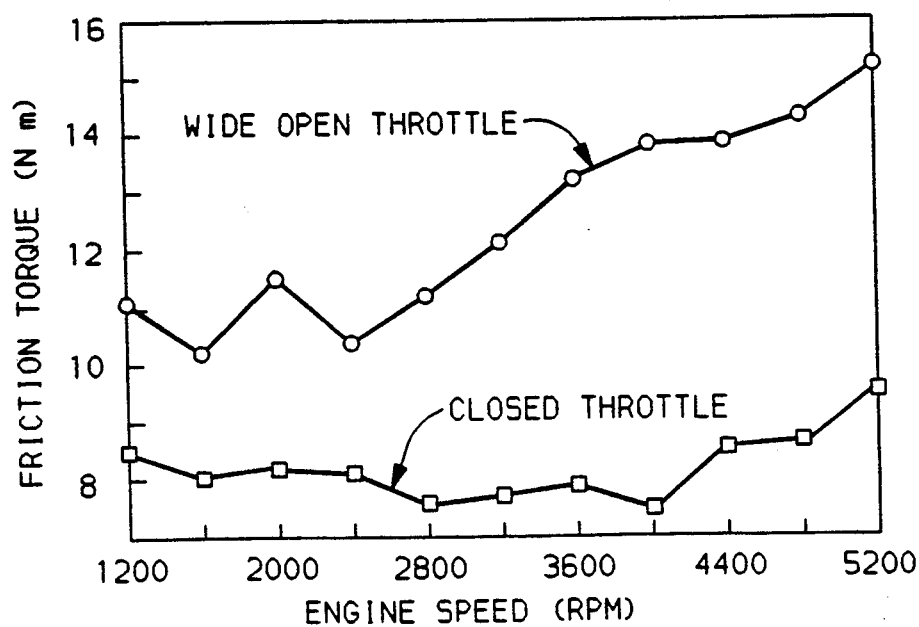
FIG. 2 graphically illustrates the difference in frictional torque acting on a crankcase scavenged, two-stroke engine, when the engine air throttle valve is in the completely closed and wide open positions.

It has been found that for a crankcase scavenged, two stroke engine, a relationship exists between frictional torque and the quantity of air inducted into the engine. Referring now to FIG. 2, there is shown a graph, which is representative of the measured difference in frictional torque acting on a crankcase scavenged, two-stroke engine as a function of engine speed, when the engine air throttle valve is in the completely closed and the wide open positions. It is believed that the illustrated difference in frictional torque results from the additional work performed by the engine in compressing the larger quantities of air inducted into the engine crankcase chambers, when the throttle valve is wide open.

The present invention is directed toward utilizing the above relationship, by regulating the quantity of air inducted by a crankcase scavenged engine, during DFCO operation, to provide additional frictional torque and improve engine braking. As applied to the engine 10 illustrated in FIG. 1, this is accomplished by first detecting engine operating conditions, which indicate that engine 10 is operating in the DFCO mode. In response to these detected operating conditions, the quantity of air inducted into engine 10 is decreased, for a predetermined period of time. After this period of time elapses, the quantity of air inducted into the engine 10 is then increased.

Preferably, the quantity of air inducted by the engine 10 is regulated by the degree of opening of the throttle valve 24, which is disposed in the engine air intake system 22. After detecting engine operation in the DFCO mode, the throttle valve 24 is completely closed, to decrease the quantity of air inducted by engine 10. Assuming that the exhaust system of engine includes a catalytic converter (not shown), the closing of throttle valve 24 decreases engine air flow, thereby extending the period of time that the catalyst remains at efficient operating temperatures. After a predetermined time has elapsed, the efficiency of the catalyst will have diminished due to cooling, so the quantity of air inducted by the engine can be increased, without significantly impacting engine exhaust emissions. Throttle valve 24 is then opened, at a defined rate, to its fully open position. As a result, engine 10 is gradually loaded by the additional inducted air, to smoothly increase engine braking to a maximum, during extended DFCO operation.

Figure 3:
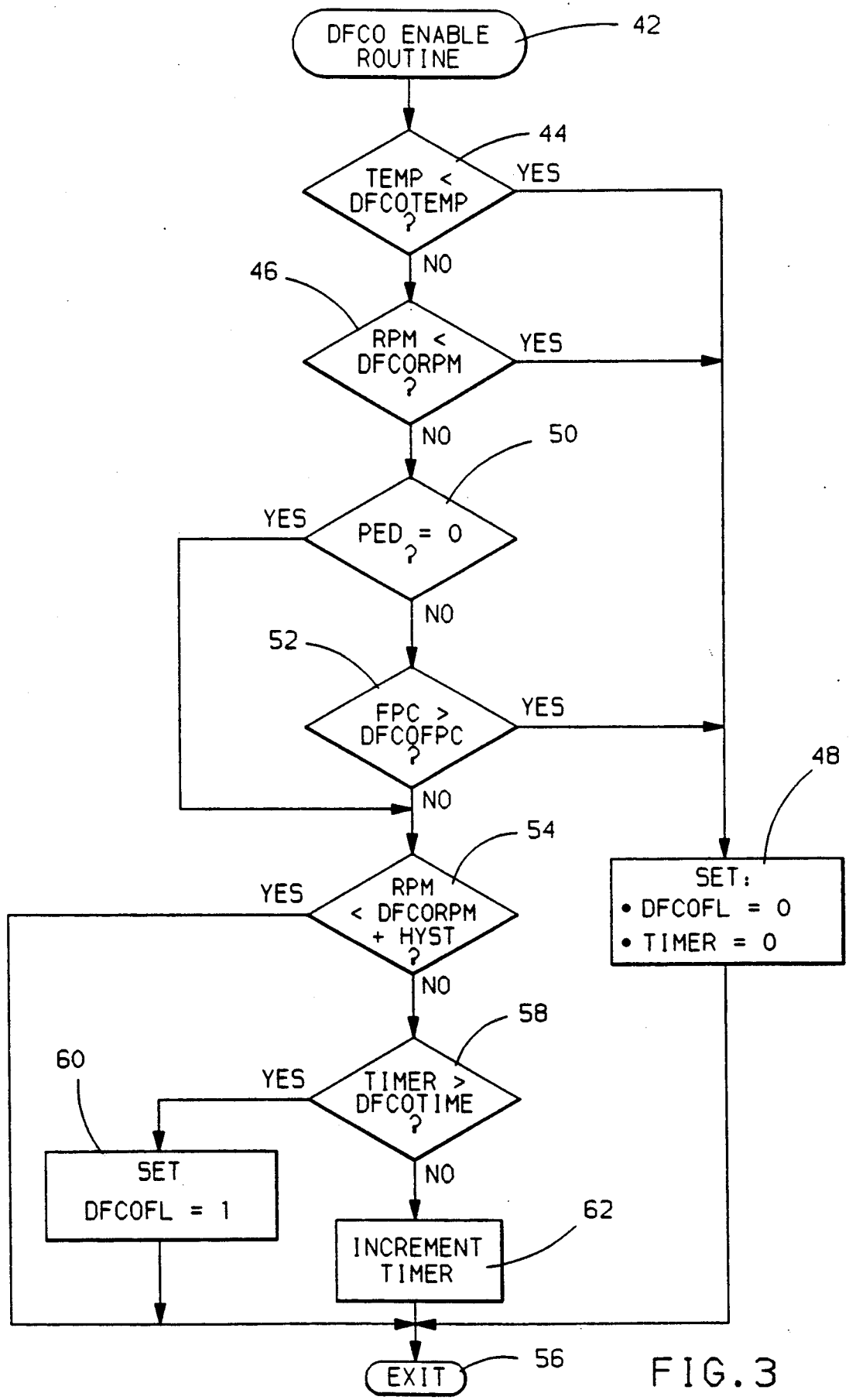
FIG. 3 is a flow diagram representative of the steps executed by the electronic control unit of FIG. 1, when detecting engine operating conditions indicating engine operation in the deceleration fuel cut-off mode.

Referring now to FIG. 3, there is shown a flow diagram representative of the steps executed by ECU 26 in detecting engine operating conditions, which indicate the initiation of the DFCO mode of engine operation. After engine startup, all counter, flags, registers, and timers within the ECU 26 are initialized to the appropriate values. After this initialization, the DFCO enable routine of FIG. 3 is continuously executed as part of the main looped engine control program stored within ECU 26.

The routine is entered at point 42 and proceeds directly to step 44. At step 44, a decision is required as to whether the engine coolant temperature, as indicated by the TEMP input signal, is less than a predetermined temperature DFCOTEMP (for example, 70° C.), below which entry into DFCO is prohibited because the engine has not adequately warmed up. If TEMP is not less than DFCOTEMP, the routine proceeds to step 46; otherwise, it proceed to step 48.

When the routine proceeds to step 46, another decision is required as to whether RPM, the rotational speed of the engine, is less than a predetermined speed DFCORPM. A value for RPM can be derived from the POS input signal to ECU 26, by counting the number of equally spaced tooth pulses occurring in a specified time period. When the engine speed is less than DFCORPM (for example, 1500 revolutions per minute), the engine is so near idle that substantially no benefit would be realized by enabling DFCO. Thus, if RPM is less than DFCORPM, the routine proceeds to step 48. However, if RPM is not less than DFCORPM, the routine then proceeds to step 50.

At step 50 a decision is required as to whether the engine is operating at idle For the embodiment illustrated in FIG. 1, this is accomplished by determining whether the PED input signal is equal to zero (i.e. the accelerator pedal is in the idle position). If PED equals zero, entry into DFCO is not prohibited and the routine proceeds to step 54. If PED does not equal zero, indicating operator demand for engine output above idle, the routine proceeds to step 52.

At step 52, the quantity of fuel injected per cylinder FPC is checked to determine if it exceeds a predetermined amount DFCOFPC (for example, 2 milligrams per cylinder per cycle). If FPC is not greater than the relatively small amount represented by DFCOFPC, the engine is considered to essentially be at idle, even though the accelerator pedal is not positioned exactly for idling, and the routine proceeds to step 54. However, if FPC is greater that DFCOFPC, the engine is considered not to be at, or near idle, and the routine proceeds to step 48.

When the routine proceeds to step 54, a decision is required as to whether the engine rotational speed RPM is less than the predetermined engine speed DFCORPM used at step 46, plus a hysteresis factor HYST (for example, 200 revolution per minute). If RPM is less than DFCORPM +HYST (in this case, 1700 revolutions per minute), the routine proceeds to step 56, where the routine is exited. However, if RPM is not less than DFCORPM +HYST, the routine proceeds to step 58.

At step 58, a decision is required as to whether a value of the TIMER exceeds a predetermined time DFCOTIME (for example, 500 milliseconds). If TIMER is greater that DFCOTIME, the routine proceeds to step 60, where a DFCOFL flag is set to a value of one, to indicate that engine operating conditions exist for initiating the DFCO mode, and the routine is then exited at point 56. However, if the value of TIMER does not exceed DFCOTIME, at step 58, the routine proceeds to step 62, where the value of the TIMER is incremented, prior to exiting the routine at point 56.

If the routine proceeds to step 48 from either of steps 44, 46, or 52, the DFCOFL flag and the TIMER are set to values of zero, indicating that the engine operating conditions necessary for initiating DFCO do not exist. After setting these values, the routine is exited at point 56.

In summary, when the engine operating conditions are such that (1) the coolant temperature is less than DFCOTEMP; (2) the engine rotation speed is not less than DFCORPM +HYST; (3) either the accelerator pedal is at the idle position, or the quantity of fuel injected per cylinder per cycle is not greater DFCOFPC; and (4) the these conditions have not changed for a period of time defined by DFCOTIME, the routine will proceed to step 60, where the DFCOFL flag is set, to initiate operation in the DFCO mode.

When the engine operating conditions are such that either (1) the coolant temperature is not less than DFCOTEMP; (2) the engine rotational speed is not less than DFCORPM; or (3) the accelerator pedal is not at idle and the fuel injected per cylinder per cycle is greater than DFCOFPC, the routine proceeds to step 48, where the DFCOFL flag is set to initiate recovery from DFCO, when the engine is operating in that mode.

When operating conditions exist for initiating the DFCO mode, except that engine rotational speed falls within the range between DFCORPM and DFCORPM +HYST (step 44 in combination with step 54), the routine is exited without setting the DFCOFL flag at step 60, or incrementing the TIMER at step 62. This prevent oscillations that would otherwise occur between setting the DFCOFL flag at steps 48 and 60, if the engine rotational speed swings slightly above and below the defined DFCORPM speed.

When the DFCOFL flag is set to one, the ECU 26 interrupts the injection of fuel into the cylinders of engine 10. This may be accomplished by either masking or gating the fuel and air output signal pulses (such as, F1-F3 and A1-A3), so they do not arrive at their respective fuel injectors. Alternatively, the widths of these pulses could be set to a value of zero, which will effectively eliminate the pulses. It has been found advantageous to interrupt the air pluses as well as the fuel pulses to pneumatic type injectors, during DFCO. This prevents the air pulses from drying out the residual fuel remaining in the injectors, after the fuel pulses are interrupted, and assures that the proper quantity of fuel will immediately be injected into the cylinders, when the DFCOFL flag is set to zero and the fuel pulses are again applied to the injectors.

Figure 4:
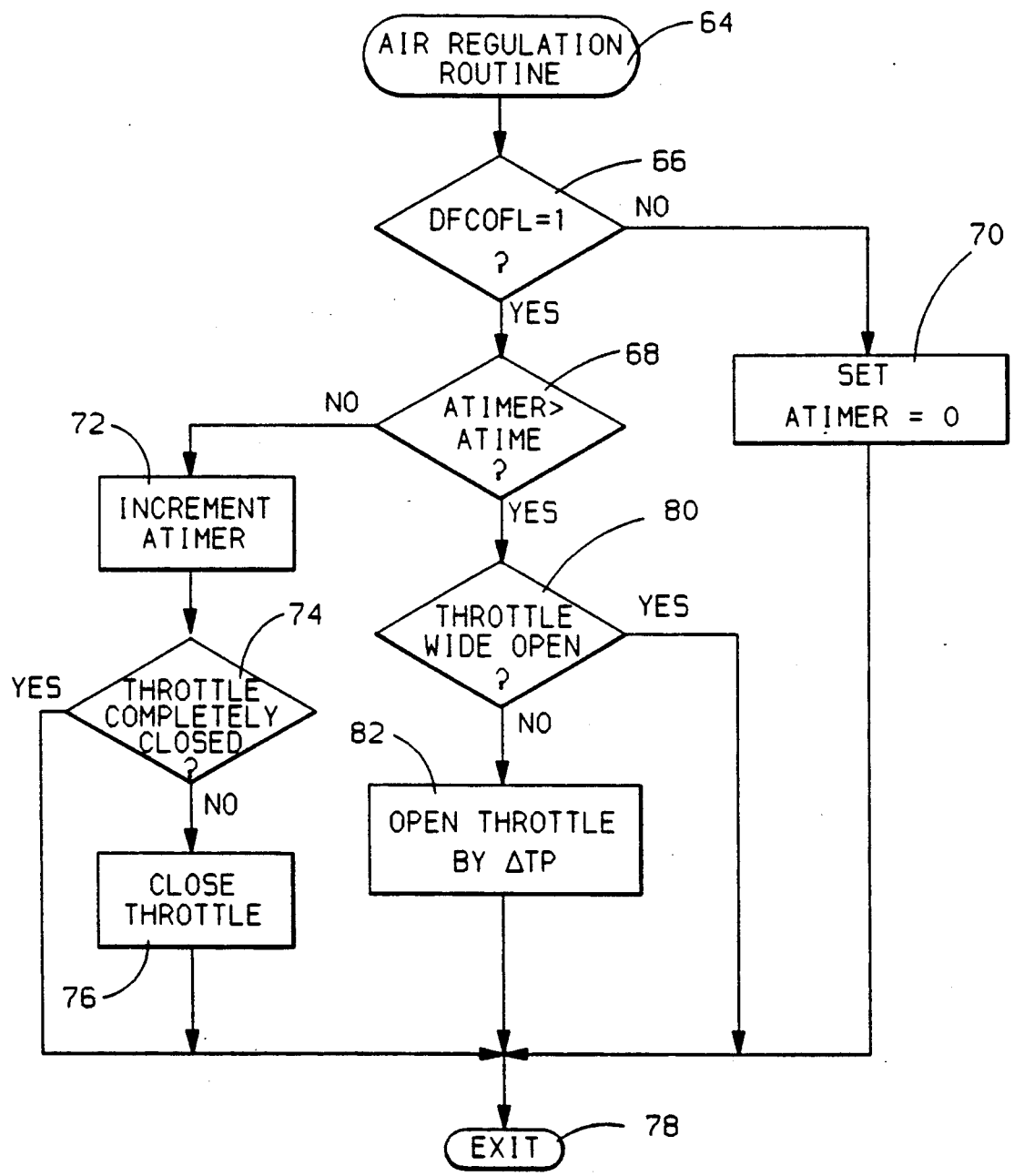
FIG. 4 is a flow diagram representative of the steps executed by the electronic control unit of FIG. 1, when regulating the quantity of air inducted by the engine, during the deceleration fuel cut-off operating mode, in accordance with the principles of the present invention.

Referring now to FIG. 4, there is shown a flow diagram representative of the steps executed by ECU 26, in regulating the quantity of air inducted by engine 10, during DFCO operation, in accordance with the principles of the present invention.

The air regulation routine represents a part of the main looped engine control program, that is continuously executed after engine 10 is started. The routine is entered at point 64 and immediately proceeds to step 66.

At step 66, a decision is required as to whether the DFCOFL flag is equal to one. If DFCOFL has been set to a value of one, this indicates that the engine is operating in the DFCO mode, in response to the detected engine operating conditions illustrated in the previous routine (FIG. 3). If DFCOFL equals one, the present routine proceeds to step 68; otherwise, the routine passes to step 70.

When the routine is directed to step 70, from decision step 66, the value of a timer ATIMER is set to zero, prior to exiting the routine at point 78.

When the routine is directed to step 68, from step 66, a decision is required as to whether a predetermined period of time, represented by ATIME (for example, 9.7 seconds), has been exceeded by the timer ATIMER. If the value of ATIMER is not greater that ATIME, the routine proceeds to step 72. When the value of ATIMER exceeds ATIME, the routine is directed to step 80.

If the routine proceeds to step 72, from decision step 68, the value of ATIMER is incremented, prior to passing to step 74. Then at step 74, a decision is required as to whether the throttle valve 24 is in the completely closed position. The ECU 26 maintains a value representative of the current position of the throttle valve 24, based upon the past movement induced by the output throttle position signal TP. If the throttle valve 24 is completely closed, the routine exits at point 78. However, if throttle valve 24 is not in the completely closed position, the routine passes to step 76, where the appropriate TP output signal is generated to completely close throttle valve 24, before exiting the routine at step 78.

When the routine proceeds to step 80, from the step 68, an additional decision is required, as to whether or not the throttle valve 24 is in its wide open position. If throttle valve 24 is in the wide open position, the routine proceeds to exit at step 78. However, if throttle valve 24 is not in its wide open position, the routine passes to step 82.

At step 82, the appropriate output signal TP is generated to open throttle valve by an amount designated as ΔTP (for example, 0.4% of the available movement between the completely closed and wide open positions), without exceeding the wide open limit position. Thus, the rate at which the throttle valve 24 is opened is defined by the amount of opening ΔTP, divided by the time between consecutive executions of the routine of FIG. 4 (as for example, approximately every 8 milliseconds).

In summary, the air regulation routine of FIG. 4 determines whether the engine is operating in the DFCO mode, based on the value of the DFCO flag (step 66), which is set in accordance with the detection of the specific engine operation conditions, as carried out in the routine of FIG. 3.

When operation in the DFCO mode is detected, the throttle valve 24 is moved to its completely closed position, for a predetermined period of time represented by ATIME (step 68). After the predetermined period of time has elapsed, the throttle valve 24 is gradually opened to the wide open position, at a rated defined by the amount ΔTP (step 82) and the time between consecutive executions of the air regulation routine.

In the above described embodiment of the present invention, the amount of fuel injected into the engine was determined by the movement of the accelerator pedal 38, with the quantity of inducted engine air being controlled by ECU 26, to achieve a desired air-fuel ratio. The present invention would be equally applicable to an engine control system, where the quantity of air inducted by the engine is determined by the movement of an accelerator pedal, with the amount of injected fuel being controlled by ECU 26, to achieve a desired air-fuel ratio. For this latter type of control, the quantity of air inducted by the engine during DFCO, could be regulated in accordance with the present invention, by using a stepping motor under the control of ECU 26 to open and close the throttle, just as illustrated in FIG. 1. Alternatively, for applications where the engine throttle valve is mechanically linked to the accelerator pedal, a large air passage and air bypass valve can be provided to bypass the throttle valve, and regulate the quantity of inducted air, when the throttle valve is closed to an idle position.

Thus, the aforementioned description of the preferred embodiment of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. A method for regulating the quantity of air inducted by a crankcase scavenged two-stoke engine having an air intake system for adjusting the quantity of air inducted by the engine, and a fuel supply system that operates in a fuel cut-off mode, when the engine is decelerating under defined operating conditions, the steps of the method comprising:
   detecting the operating conditions indicating engine operation in the deceleration fuel cut-off mode;
   decreasing the quantity of air indicated by the engine for a predetermined period of time, in response to the detection of the operating conditions; and
   increasing the quantity of air inducted by the engine, after the predetermined period of time has elapsed.

2. A method for regulating the quantity of air induced by a crankcase scavenged two-stoke engine having an air-intake system, with a throttle valve for adjusting the quantity of air inducted by the engine, and a fuel supply system, which operates in a fuel cut-off mode, when the engine is decelerating under defined operating conditions, the steps of the method comprising:

detecting the operating conditions indicating engine operation in the deceleration fuel cut-off mode;

closing the throttle valve to decrease the quantity of air inducted by the engine, in response to the detection of the operating conditions indicating operation in the deceleration fuel cut-off mode; and opening the throttle valve to increase the quantity of air induced by the engine, after the predetermined period of time has elapsed.

3. The method of claim 2, where the throttle valve is completely closed in response to the detection of the operating conditions indicating deceleration fuel cut-off, and after the predetermined time has elapsed, the throttle valve is opened, at a defined rate, to a fully open position.

* * * * *